United States Patent [19]

Matsumoto et al.

[11] Patent Number: 5,715,726
[45] Date of Patent: Feb. 10, 1998

[54] METHOD AND SYSTEM FOR THE DIAGNOSIS OF IDLING SPEED CONTROL SYSTEM

[75] Inventors: Takuya Matsumoto; Toru Hashimoto; Mitsuhiro Miyake, all of Kyoto, Japan

[73] Assignee: Mitsubishi Jidosha Kogyo Kabushiki Kaisha, Tokyo, Japan

[21] Appl. No.: 301,908

[22] Filed: Sep. 7, 1994

[30] Foreign Application Priority Data

Sep. 8, 1993 [JP] Japan .................................. 5-223121

[51] Int. Cl.⁶ ...................... G01M 15/00; F02D 41/16; F02D 41/22
[52] U.S. Cl. ...................... 73/118.1; 73/116; 123/339.15; 364/431.03; 364/431.07
[58] Field of Search ........................... 73/116, 117.2, 73/117.3, 118.1, 118.2; 123/339.15; 364/431.03, 431.07

[56] References Cited

U.S. PATENT DOCUMENTS

| | | | |
|---|---|---|---|
| 4,794,790 | 1/1989 | Margarit-Metaxa et al. | 73/117.3 |
| 4,960,087 | 10/1990 | Junginger et al. | 123/339.15 |
| 5,005,129 | 4/1991 | Abe et al. | 364/424.03 |
| 5,046,467 | 9/1991 | Arnold et al. | 123/339.15 |
| 5,056,483 | 10/1991 | Ohuchi | 123/339.15 |
| 5,080,061 | 1/1992 | Nishimura | 123/339.15 |
| 5,117,682 | 6/1992 | Amano | 73/118.1 |
| 5,124,919 | 6/1992 | Kastelle | 73/118.1 |
| 5,333,585 | 8/1994 | Kuroda | 123/339.15 |
| 5,375,056 | 12/1994 | Nitschke et al. | 73/117.3 |
| 5,522,363 | 6/1996 | Gotoh | 123/339.15 |

FOREIGN PATENT DOCUMENTS

| | | | |
|---|---|---|---|
| 57-186038 | 11/1982 | Japan | 123/339.15 |
| 58-48752 | 3/1983 | Japan | 123/339.15 |

Primary Examiner—George M. Dombroske
Attorney, Agent, or Firm—Evenson, McKeown, Edwards & Lenahan, P.L.L.C.

[57] ABSTRACT

A system for the diagnosis of an idling speed control system has a first timer for measuring the time elapsed since entrance to a feedback control mode, an engine speed state detection unit for detecting whether the engine speed has fallen within a predetermined speed range, a second timer for measuring the time elapsed since the engine speed has been detected to fall within the speed range, and a normality determining unit for determining that the idling speed control system is in order, when the time measured by the first timer is within a first preset time and also the engine speed is detected to have fallen within the speed range and has remained in the speed range until the time measured by said second timer reaches a second preset time. By adopting such a diagnosis method that instead of instantaneously determining an idling speed control system as being in order even after the engine speed has once fallen within a speed range to which the engine is intended to be controlled, any subsequent potential disorder of the idling speed control system is also taken into consideration. This has made it possible to obtain high-reliability information, for example, even when information for the diagnosis of a fault of the idling speed is collected on board.

11 Claims, 5 Drawing Sheets

METHOD AND SYSTEM FOR THE DIAGNOSIS OF IDLING SPEED CONTROL SYSTEM

BACKGROUND OF THE INVENTION a) Field of the Invention

This invention relates to an idling speed control system for controlling the speed of an internal combustion engine (hereinafter simply referred to as the "engine") during an idling operation, and especially to a method and system for the diagnosis of the state of the idling speed control system.

b) Description of the Related Art

It has conventionally been practiced to set a target idling speed corresponding to each state of idling operation of an engine and based on the target idling speed, to control the quantity of air to be fed to an engine so that feed-back control is performed to make the engine speed equal to the target idling speed. A variety methods have also been proposed for the determination of a fault with respect to such idling speed control systems.

Such proposals include, for example, to stop engine speed control by an idling speed control system when the deviation of an engine speed from a reference value became equal to or greater than a predetermined value and has remained at such a level for at least a predetermined time [see Japanese Patent Application Laid-Open (Kokai) No. SHO 56-141036] or to determine that the system is out of order when after the target idling speed was changed, the engine speed has not fallen in a predetermined time within a predetermined range including the new target idling speed [Japanese Patent Application Laid-Open (Kokai) No. SHO 60-104738].

Once the engine speed falls within a speed range to which the engine speed is intended to be controlled, these conventional methods however instantaneously determine that the system is in order, so that the possibility of any subsequent disorder of the system is not taken into consideration. There is accordingly the problem that information of high reliability can hardly be obtained in such a case as on-board collection of information for the diagnosis of a fault of the system.

SUMMARY OF THE INVENTION

With the foregoing in view, the present invention has as a primary object the provision of a method and system for the diagnosis of an idling speed control system, which method and system have made it possible to obtain information of high reliability—for example, even in such a case as on-board collection of information for the diagnosis of the idling speed control system—by adopting, in view of the possibility of a subsequent disorder of the idling speed control system, such diagnostic procedures that do not instantaneously determine the idling speed control system as being in order even after the engine speed has once fallen within an engine speed range to which the engine speed is intended to be controlled.

In one aspect of the present invention, there is thus provided a method for the diagnosis of an idling speed control system. The system compares a target idling speed with an engine speed when an internal combustion engine is operated in a feedback control mode and based on the result of the comparison, controls the quantity of air to be fed to said engine so that the engine is feedback-controlled to make the engine speed equal to the target idling speed. The method comprises the following step:

(1-1) the idling speed control system is determined to be out of order when the engine speed has departed from a predetermined speed range including the target idling speed after the engine speed fell within the predetermined speed range during operation in the feedback control mode.

The diagnosis method according to the present invention may also comprise the following step:

(2-1) the idling speed control system is determined to be in order when the engine speed remains for a predetermined time within a predetermined speed range including the target idling speed after the engine speed has fallen within the predetermined speed range during operation in the feedback control mode.

The diagnosis method according to the present invention may also comprise the following step:

(3-1) the idling speed control system is determined to be in order when after entrance to the feedback control mode, the engine speed fell in a first preset time within a predetermined speed range including the target idling speed and has then remained in the speed range for a second preset time.

The diagnosis method according to the present invention may also comprise the following steps:

(4-1) the idling speed control system is determined to be in order when after entrance to the feedback control mode, the engine speed fell in a first preset time within a predetermined speed range including the target idling speed and has then remained in the speed range for a second preset time; but (4-2) the idling speed control system is determined to be out of order when after entrance to the feedback control mode, the engine speed falls in the first preset time within the speed range but has then departed from the speed range.

Further, the idling speed control system may also be determined to be out of order when the engine speed does not fall within the predetermined speed range even after the first preset time has elapsed after entrance to the feedback control mode.

The predetermined speed range may be set so that the difference between the upper limit of the predetermined speed range and the target idling speed becomes greater than the difference between the target idling speed and the lower limit of the predetermined speed range.

In another aspect of the present invention, there is also provided a system for the diagnosis of an idling speed control system. The idling speed control system compares a target idling speed with an engine speed when an internal combustion engine is operated in a feedback control mode and based on the result of the comparison, controls the quantity of air to be fed to said engine so that the engine is feedback-controlled to make the engine speed equal to the target idling speed. The diagnosis system comprises:

first timer means for measuring the time elapsed since the time point of entrance to the feedback control mode;

engine speed state detection means for detecting whether or not the engine speed has fallen within a predetermined speed range including the target idling speed;

second timer means for measuring the time elapsed since the engine speed has been detected by said engine speed state detection means to fall within the predetermined speed range; and normality determining means for determining that said idling speed control system is in order, when the time measured by said first timer means is within a first preset time, the engine speed has been detected by said engine speed state detection means to have fallen within the predetermined speed range and the engine speed has remained in the predetermined speed range until the time measured by said second timer means reaches a second preset time.

The diagnosis system may further comprises abnormality determining means for determining that said idling speed control system is out of order, when the time measured by said first timer means is within the first preset time and the engine speed is detected by said engine speed state detection means to have fallen within the predetermined speed range but the engine speed has then departed from the predetermined speed range.

The abnormality determining means may preferably determine that said idling speed control system is out of order, when the engine speed does not fall within the predetermined speed range even after the first preset time has elapsed since entrance to the feedback control mode.

The predetermined speed range may be set so that the difference between the upper limit of the predetermined speed range and the target idling speed becomes greater than the difference between the target idling speed and the lower limit of the predetermined speed range.

By adopting, in view of the possibility of a subsequent disorder of the idling speed control system, such diagnostic procedures that do not instantaneously determine the idling speed control system as being in order even after the engine speed has once fallen within an engine speed range to which the engine speed is intended to be controlled, the present invention can therefore obtain, without the need for addition of any special sensor or the like, information of high reliability, for example, even in such a case as onboard collection of information for the diagnosis of a fault of the system, leading to the advantage that a contribution can be made to substantial improvements in repair services.

When the predetermined speed range is set so that the difference between the upper limit of the predetermined speed range and the target idling speed becomes greater than the difference between the target idling speed and the lower limit of the predetermined speed range, the engine speed is ensured to fall within the above speed range even when the engine control is changed back to the engine speed feedback control mode. This has the advantage that wrong determination can be prevented.

DETAILED DESCRIPTION OF THE PREFERRED EMBODIMENT

The system according to the one embodiment of the present invention for the diagnosis of the idling speed control system will hereinafter be described with reference to the drawings.

Figure 3:
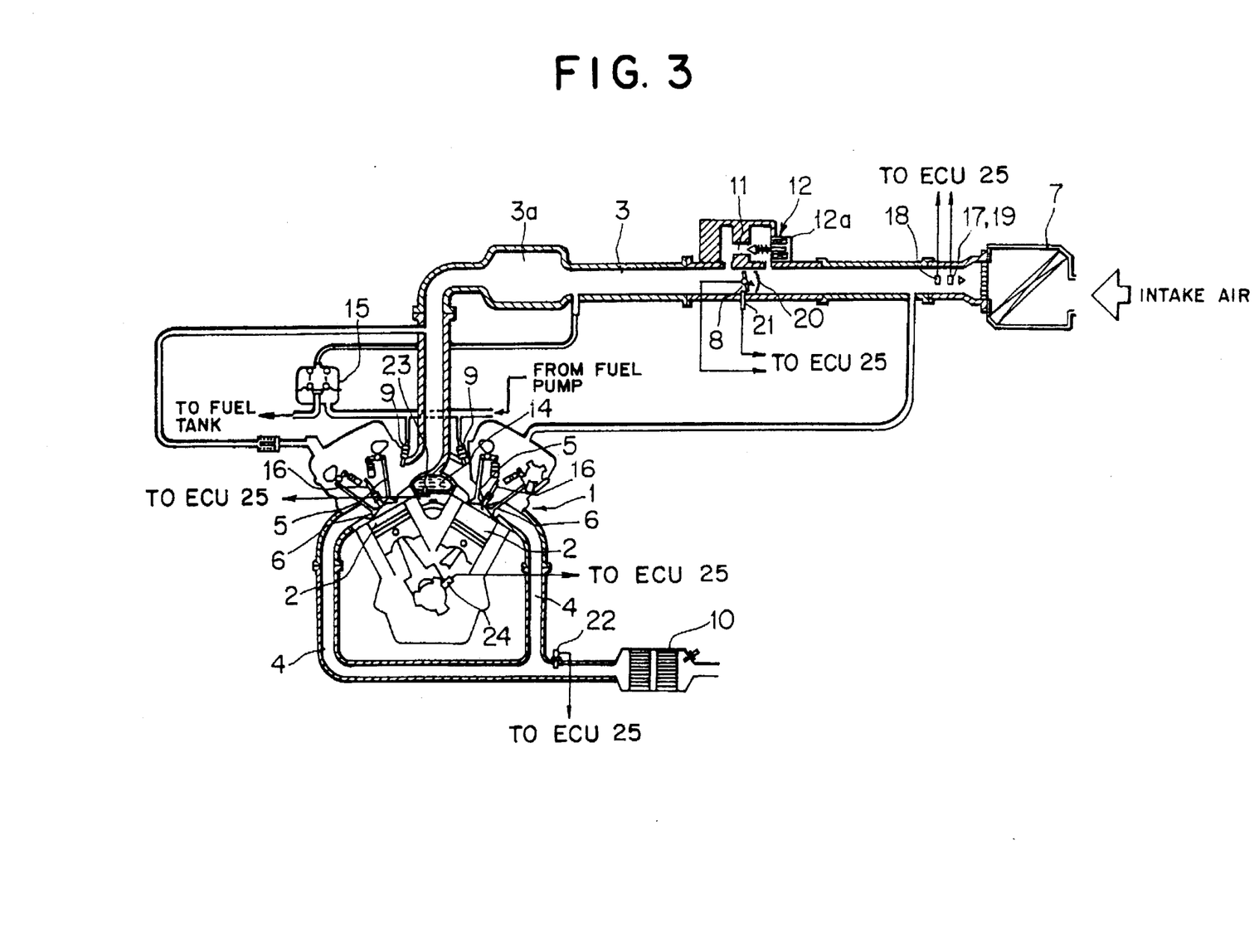
FIG. 3 is an overall construction diagram of the engine system equipped with the diagnosis system.

An engine system for an automotive vehicle in which the diagnosis system can be installed may be illustrated as shown in FIG. 3. In FIG. 3, an engine 1 has an intake passage 3 and an exhaust passage 4, both of which are communicated to a combustion chamber 2. The communication between the intake passage 3 and the combustion chamber 2 is controlled by an intake valve 5, while the communication between the exhaust passage 4 and the combustion chamber 2 is controlled by an exhaust valve 6.

The intake passage 3 is provided with an air cleaner 7, a throttle valve 8 and an electromagnetic fuel injection valve (injector) 9, which are arranged successively from an upstream side of the intake passage 3. The exhaust passage 4, on the other hand, is provided with a catalytic converter (three-way catalyst) 10 for the purification of exhaust gas and an unillustrated muffler (noise eliminator) successively from an upstream side of the exhaust passage 4. The intake passage 3 is also provided with a surge tank 3a. The throttle valve 8 is connected to an accelerator pedal (not shown) by way of a wire cable, whereby its position (opening) can be adjusted depending on the amount of depression of the accelerator pedal.

Incidentally, the exhaust passage 3 is provided with a bypass passage 11 which extends bypassing the throttle valve 8. Inserted in this bypass passage 11 is a stepper motor valve (hereinafter called the "STM valve") 12 which functions as an ISC (idling speed control) valve.

This STEM valve 12 is constructed of a valve element which can be brought into contact with a valve seat portion formed on an upstream side in the bypass passage 11, a stepper motor (ISC actuator) 12a for controlling the position of the valve element, and a spring normally biasing the valve element against the valve seat portion(i.e., in the direction that the bypass passage 11 is closed by the valve element).

By adjusting the position of the valve element stepwise (according to the number of steps) relative to the valve seat portion by the stepper motor 12a, the opening between the valve seat portion and the valve element, that is, the position of the STM valve 12 can be controlled.

Control of the position of the STM valve 12 by ECU, which will be described subsequently herein, makes it possible to feed intake air to the engine 1 through the bypass passage 11 during idling irrespective of operation of the accelerator pedal by the driver. By changing the position of the STM valve 12, the quantity of air to be inducted through the throttle bypass passage 11 can be controlled.

In FIG. 13, numeral 15 indicates a fuel pressure regulator. This fuel pressure regulator 15 is actuated responsive to a negative pressure in the intake passage 3 to control the quantity of fuel to be returned from an unillustrated fuel pump to an unillustrated fuel tank, so that the pressure of fuel to be injected from the injector 9 can be controlled.

Accordingly, the air inducted through the air cleaner 7 in accordance with not only the position of the throttle valve 8 but also the position of the STM valve 12 is mixed with the fuel from the injector 9 in an intake manifold to give an appropriate air/fuel ratio, and is then fed into the combustion chamber 2.

To control the state of operation of the engine 1, various sensors are arranged. First, as is shown in FIG. 3, a portion where intake air flowed past the air cleaner 7 flows into the intake passage 3 is provided with an air flow sensor (inducted air quantity sensor) 17 for detecting the quantity of the inducted air from Karman vortex information, an intake air temperature sensor 18 for detecting the temperature of the inducted air and an atmospheric pressure sensor 19 for detecting the atmospheric pressure.

At the position of arrangement of the throttle valve 8 in the intake passage 3, there are arranged a throttle position sensor 20 in the form of a potentiometer for detecting the position of the throttle valve 8 as well as an idling switch 21 for mechanically detecting a fully closed state of the throttle valve 8 (i.e., an idling state) from the position of the throttle valve 8.

On the side of the exhaust passage 4, on the other hand, an oxygen concentration sensor (hereinafter referred to simply as the "$O_2$ sensor") 22 for detecting the concentration of oxygen ($O_2$ concentration) in the exhaust gas is disposed on an upstream side of the catalytic converter 10. Other sensors include a coolant temperature sensor (coolant temperature detecting means) 23 for detecting the temperature of coolant 14 of the engine 1 and a crank angle sensor 24 for detecting a crank angle (which can also function as a speed sensor for detecting an engine speed Ne)

Figure 2:
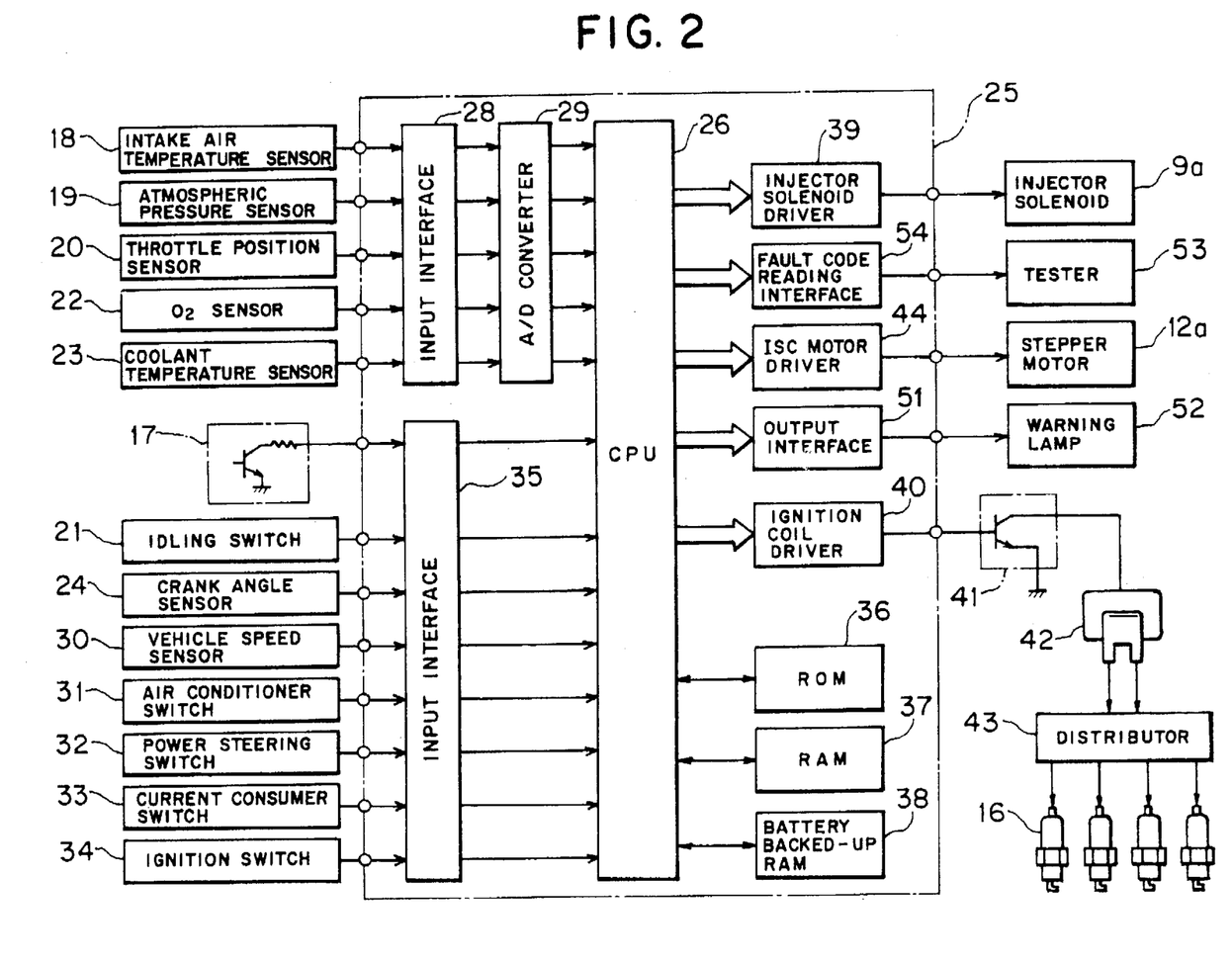
FIG. 2 is a hard block diagram of a control system for an engine system equipped with the diagnosis system.

Detection signals from these sensors and switch are inputted to an electronic control unit (ECU) 25 as shown in FIG. 2.

The hardware construction of ECU 25 can be illustrated as shown in FIG. 2. ECU 25 is provided as a principal component thereof with CPU 26. To CPU 26, detection signals from the intake air temperature sensor 18, the atmospheric pressure sensor 19, the throttle position sensor 20, the $O_2$ sensor 22 and the coolant temperature sensor 23 are inputted via an input interface 28 and an A/D converter 29.

Directly inputted through an input interface 35 to CPU 26 are detection signals (digital signals) from the air flow sensor 17, the idling switch 21, the crank angle sensor 24, a vehicle speed sensor 30 and the like as well as on/off signals from an air conditioner switch 31, a power steering switch 32, current consumer switches (switches of fog lamps and head lamps) 33, an ignition switch (key switch) 34 and the like.

Further, CPU 26 can exchange data through bus lines with ROM (memory means) 36 which stores program data, fixed value data and various other data, RAM 37 which can be updated, i.e., can be successively rewritten and a battery-backed-up RAM 38 which can hold stored information as long as connected to a battery, i.e., backed up by the battery. Whenever the ignition switch 34 is turned off, the data of RAM 37 are erased to reset RAM 37.

As a result of computation by CPU 26, signals for controlling the state of operation of the engine 1 and the state of various accessories, for example, various control signals such as a fuel injection control signal, an idling speed control signal, an air conditioner control system, a fuel pump control signal, an ignition timing control signal, an engine check lamp lighting signal and an alarm lamp lighting signal are outputted from ECU 25. In addition, fault code information, for example, on the idling speed control system is also outputted from ECU 25.

Of these control signals, the fuel injection control (air/fuel ratio control) signal is outputted from CPU 26 to an injector solenoid 9a (precisely, a transistor for the injector solenoid 9a) for driving the injector 9 via an injector solenoid driver 39. The ignition timing control signal, on the other hand, is outputted from CPU 26 to a power transistor 41 via an ignition coil driver 40, so that a current is fed from the power transistor 41 to the distributor 43 via an ignition coil 42 to make the individual spark plugs 16 spark successively. Further, the idling speed control signal is outputted from CPU 26 to the stepper motor 12a of the STM valve 12 via an ISC motor driver 44. Further, the alarm lamp lighting signal is outputted to an alarm lamp 52 via an output interface 51, and upon connection of a tester 53, the fault code information is outputted to the tester 53 via a fault code reading interface 54.

Figure 1:
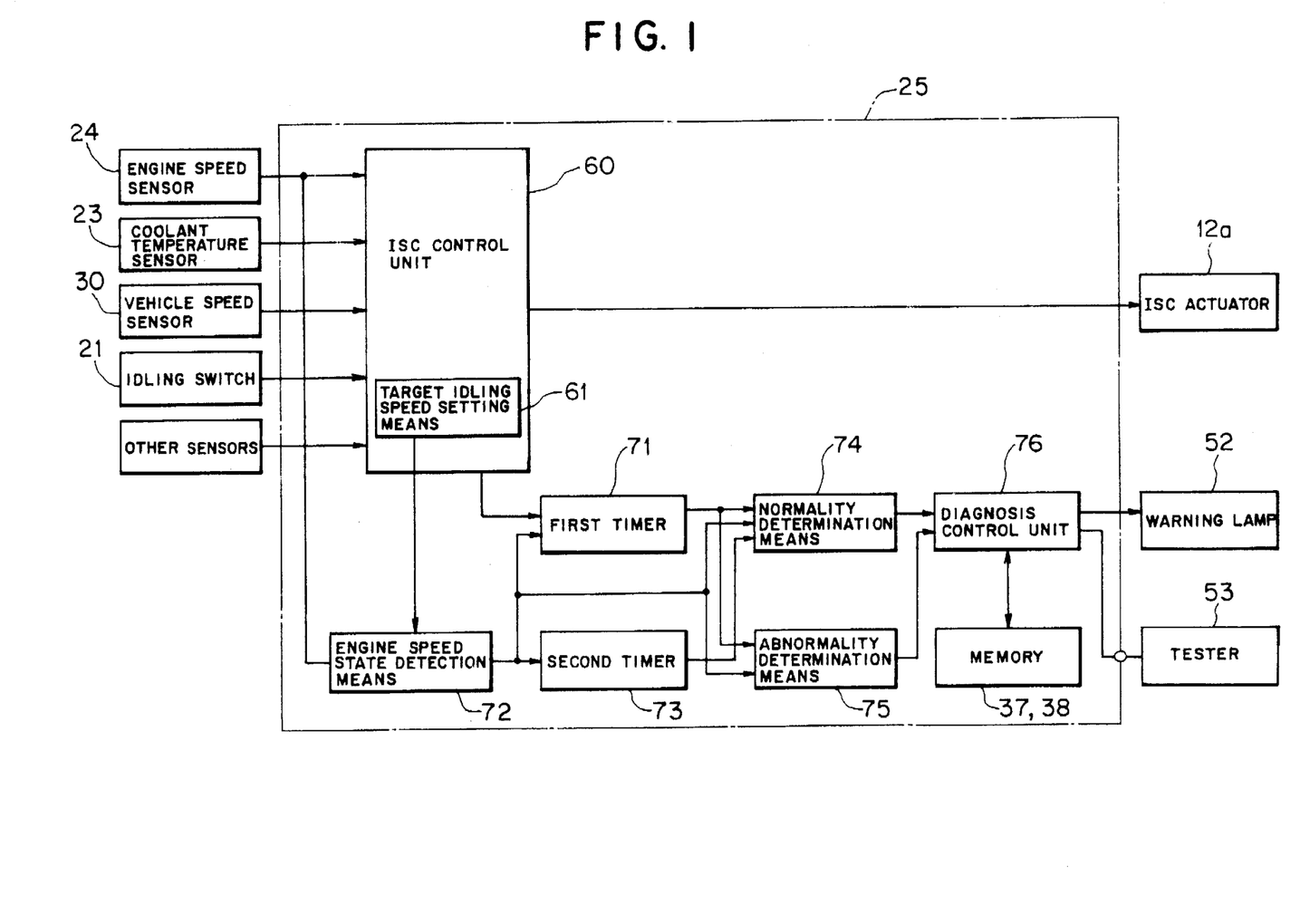
FIG. 1 is a control block diagram of a system according to one embodiment of the present invention for the diagnosis of an idling speed controlling system.

Focusing now on the idling speed control in the course of idling by the idling speed control system, ECU 25 is provided, as shown in FIG. 1, with an ISC control unit 60 to perform this idling speed control. This ISC control unit 60 has functions such as idling speed feedback means and position feedback control means.

Here, the idling speed feedback means controls by the STEM valve 12 the quantity of air, which is to be fed to the engine, on the basis of a target idling speed Nt set according to the state of idling operation of the engine (engine speed, coolant temperature, vehicle speed, etc.), so that feedback control is effected to control the engine speed Ne to the target engine speed Nt. The position control means controls by the STM valve 12 the quantity of air, which is to be fed to the engine, on the basis of a target position of the STM valve 12 set according to the state of idling operation of the engine (engine speed, coolant temperature, vehicle speed, current electric consumption, etc.), so that the actual position of the STM valve 12 is controlled to a target position. To this end, a target valve position setting means for feeding back the idling speed (target speed setting means) 61 and the position-controlling target position setting means (not shown) are also arranged.

In the illustrated embodiment, the position data of the STM valve 12 can be given by data on the number of steps driven by the stepper motor 12a.

The idling speed control by the idling speed control system first reads information on the state of operation of the engine 1, for example, an engine speed Ne from the crank angle sensor (engine speed sensor) 24, a coolant temperature (information on the state of temperature of the engine 1) from the coolant temperature sensor 23, vehicle speed information from the vehicle speed sensor 30, an ON/OFF signal from the idling switch 21, and ON/OFF signals from various switches 31–33 of the accessories as well as an A/N ratio from the air flow sensor 17, an intake air temperature from the intake air temperature sensor 18, an atmospheric pressure from the atmospheric pressure sensor 19 and the like are read in CPU 26 of ECU 25.

Based on the vehicle speed information from the vehicle speed sensor 30 and the ON/OFF signals from various switches 31–33 of the accessories, it is then determined whether the vehicle is in an idling state at a stop or in a running or idling state with the accessories in changed-over states. Where the vehicle is found to be in an idling state at a stop and hence to have a relatively stable state, the idling speed feedback control is selected by taking the mode as the feedback control mode. Where the vehicle is found to be in an idling state under running or in an idling state with an accessory such as an air conditioner in an change-over transition operation state, on the other hand, the position feedback control is selected.

In the illustrated embodiment, ECU 25 also functions as the diagnosis system for the idling speed control system. As is illustrated in FIG. 1, this diagnosis system is equipped with first timer means 71, engine speed state detection means 72, second timer means 73, normality determination means 74, abnormality determination means 75, a diagnosis control unit 76, etc.

Here, the first timer means 71 is started upon entrance to the idling speed feedback control mode by the idling speed feedback means. The engine speed state detection means 72 detects whether or not the engine speed Ne has fallen within a predetermined speed range (from Nt−a2 to Nt+a1) including the target idling speed Nt. The second timer means 73 is started upon detection of falling of the engine speed Ne within the speed range (from Nt−a2 to Nt+a1) by the engine speed state detection means 72 in the idling speed feedback control mode.

Further, the normality determination means 74 determines that the idling speed control system is in order, when a time counted by the first timer means 71 is not longer than a first preset time T1, the engine speed Ne is detected by the engine speed state detection means 72 to have fallen within the speed range (from Nt−a2 to Nt+a1), and this engine speed Ne is detected by the second timer means 73 to have continued for at least a second preset time T2.

The abnormality determination means 75, on the other hand, determines that the idling speed control system is out of order, when a time counted by the first timer means 71 is not longer than the first preset time T1 and the engine speed Ne is detected by the engine speed state detection means 72 to have fallen within the speed range (from Nt−a2 to Nt+a1) but then to have departed from the speed range (from Nt−a2 to Nt+a1).

Incidentally, this abnormality determination means 75 also has a function to determine that the idling speed control system is out of order, when the engine speed Ne does not fall within the above speed range (from Nt−a2 to Nt+a1) even when the first preset time T1 has elapsed after entrance to the idling speed feedback control mode.

The above speed range (from Nt−a2 to Nt+a1) is set so that the difference a1 between the upper limit Nt+a1 of the speed range (from Nt−a2 to Nt+a1) and the target idling speed Nt becomes greater than the difference a2 between the target idling speed Nt and the lower limit Nt−a2 of the speed range (from Nt−a2 to Nt+a1). When an air conditioner or the like is turned on, the control mode is changed over to the valve position control mode to raise the engine speed. The control mode is then changed back to the idling speed feedback control again. Setting of a1 and a2 in the relationship a1>a2 as described above is to ensure that the engine speed again falls within the above speed range (from Nt−a2 to Nt+a1) when the control mode is changed back to the idling speed feedback control mode. This can prevent wrong determination by the diagnosis system.

Based on the result of detection by the normality determination means 74 or the abnormality determination means 75, the diagnosis control unit 76 generates a signal to turn on the alarm lamp 52, to have fault code information stored in the memory or to read fault code information from the memory to a side of the tester 53.

The diagnosis method of the idling speed control system will next be described with reference to the flow charts of FIG. 4 through FIG. 6.

The flow for the diagnosis is started simultaneously with the initiation of operation of the idling speed control system. First, whether or not the idling speed control system has already been determined to be in order is determined in step A1 of FIG. 4 depending on whether or not a normality determination flag Fnor is set at 1.

Since the normality determination flag Fnor is set at 0 until the idling speed control system is determined to be in order and is set at 1 after determination of the "in order" state, the route that Fnor is not 1 is first taken in step A1. In the next step A2, whether or not the diagnosis system is monitoring is determined depending on whether or not a monitoring flag Fmon is 1.

As the monitoring flag Fmon is set at 1 during monitoring but otherwise at 0, the route that Fmon is not 1 is first taken in step A2.

It is then determined in step A3 whether or not the control mode is the idling speed feedback control mode. If so, the monitoring flag Fmon is set at 1 (step A4), a normality checking flag Fchk is set at 0 (step A5), and the timer count TIM1 by the first timer means 71 is then reset to 0 (step A6). Incidentally, the routine returns without doing anything unless the control mode is the idling speed feedback control mode.

After the control is determined to have entered the idling speed feedback control mode as described above, the routine then advances taking the route of the monitoring flag Fmon=1 as a result of the determination in step A2. In step A20, it is again determined whether or not the control is in the idling speed feedback control mode. When the control is in the feedback mode, it is next determined in step A7 whether or not the normality checking flag Fchk is set at 1. Since the normality checking flag Fchk is 0 in this case because of the processing in step A5, it is determined in steps A8 and A9 whether or not the engine speed Ne is in the above speed range (from Nt−a2 to Nt+a1). If the engine speed is outside the above speed range, it is then determined in step A10 whether or not the timer count TIM1 has reached the first preset time T1. In other words, it is determined whether or not the first preset time T1 has elapsed after entrance to the feedback control mode. As long as the first preset time T1 has not elapsed, the determination of "normal" or "abnormal" is not conducted.

Since the engine speed Ne usually falls within the above speed range (from Nt−a2 to Nt+a1) in the first preset time T1 after entrance to the feedback control mode, the normality checking flag Fchk is set at 1 in this case (step A11) and the timer count TIM2 of the second timer means 73 is reset to 0 (step A12).

After the normality checking flag Fchk has been set at 1 as described above, the routine advances along the route of the normality checking flag Fchk=1 in step A7. In steps A13 and A14, it is then determined whether or not the engine speed Ne is in the above speed range (from Nt−a2 to Nt+a1). If the engine speed is in the above speed range, it is then determined in step A15 whether or not the timer count TIM2 has reached the second preset time T2. As long as the second preset time T2 has not elapsed, the determination of "normal" or "abnormal" is not conducted.

Because the state in which the engine speed Ne is in the speed range (from Nt−a2 to Nt+a1) including the target idling speed Nt usually continues beyond the second preset time T2, the idling speed control system is determined to be in order in step A16 and a GOOD subroutine is started.

Figure 5:
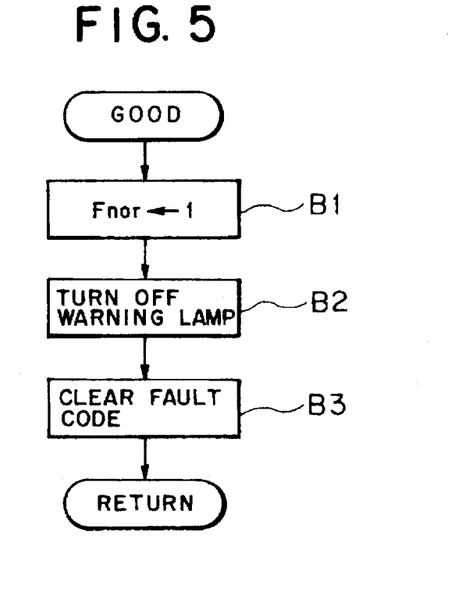
FIG. 5 is a flow chart for describing another operation by the diagnosis system.

When this GOOD subroutine is started, the normality determining flag Fnor is set at 1 in step B1, the alarm lamp 52 is turned off in step B2, and the fault code is cleared in step B3, as shown in FIG. 5.

When after entrance to the feedback control mode, the engine speed Ne fell within the speed range (from Nt−a2 to Nt+a1) including the target idling speed Nt in the first preset time T1 and this state has continued for at least the second preset time T2 as described above, the idling speed control system is determined to be in order.

If the engine speed does not fall within the above-described speed range even after the first preset time T1 has elapsed after entrance to the feedback control mode, a FAIL subroutine is started in step A17 under the assumption that the idling speed control system is out of order.

Figure 6:
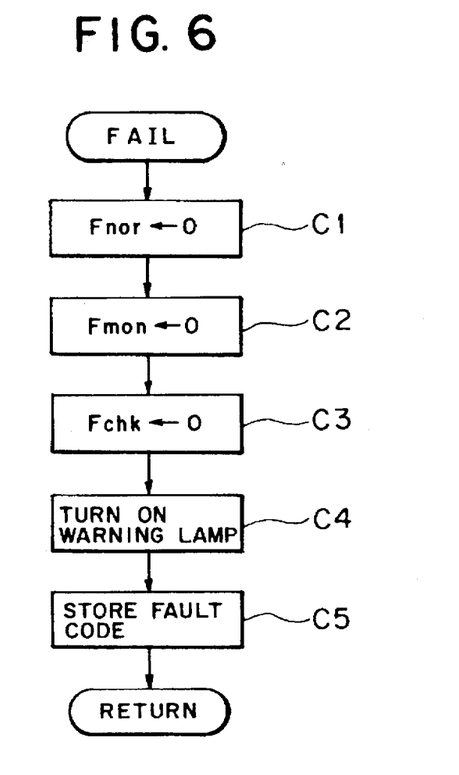
FIG. 6 is a flow chart for describing a further operation of the diagnosis system.

When this FAIL subroutine is started, the normality determination flag Fnor, the monitoring flag Fmon and the normality checking flag Fchk are all set at 0 in steps C1–C3 as shown in FIG. 6, the alarm lamp 52 is turned on in step C4, and a fault code is stored in step C5, as illustrated in FIG. 6. In this manner, on-board storage of a fault code is feasible. By lighting the alarm lamp 52 as described above, the Examiner can alarmed so. It is therefore possible to avoid running, for example, without becoming aware of the problem that the idling speed control system has failed (for example, sticking of an STM valve drive system). Further, by storing fault codes and then outputting them to a tester 53 or the like, the place of each fault can be easily specified upon repair.

When the engine speed fell within the above speed range (from Nt−a2 to Nt+a1) in the first preset time T1 after entrance to the feedback control mode but has then departed from the speed range (from Nt−a2 to Nt+a1), the idling speed control system is determined to be out of order so that the FAIL subroutine is started in step A18. Incidentally, the processing by this FAIL subroutine is as shown in FIG. 6 as described above.

Figure 4:
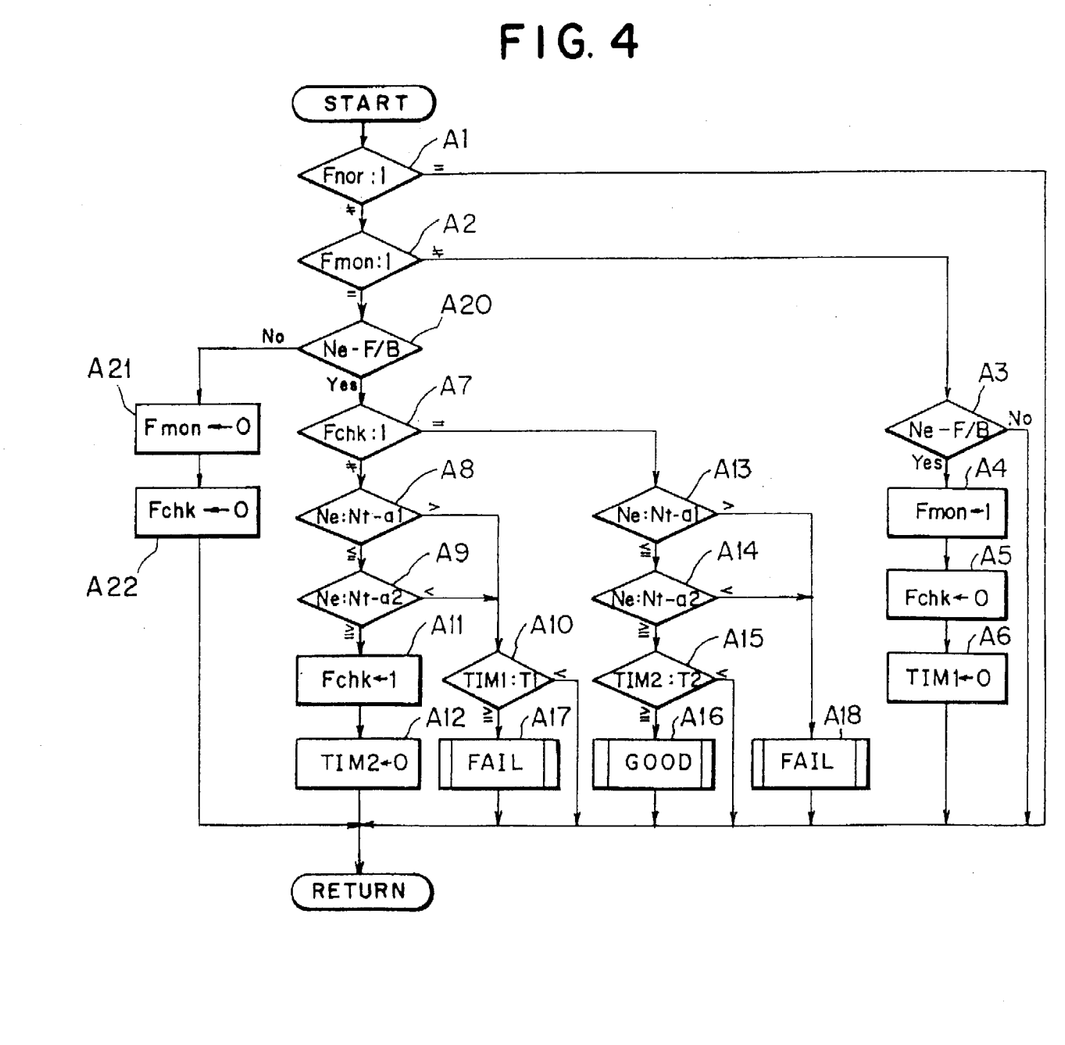
FIG. 4 is a flow chart for describing an operation by the diagnosis system.

If the idling speed feedback control is ended during monitoring, "NO" is determined in step A20 of FIG. 4. In steps A21 and A22, the monitoring flag Fmon and the normality checking flag Fchk are set at 0, respectively, whereby monitoring is stopped.

Incidentally, the above first and second preset times T1, T2 may be the same or different.

By adopting, in view of the possibility of a subsequent disorder of the idling speed control system, such diagnostic procedures that do not instantaneously determine the idling speed control system as being in order even after the engine speed has once fallen within the engine speed range (from Nt−a2 to Nt+a1) to which the engine speed is intended to be controlled as described above, information of high reliability can be obtained without the need for addition of any special sensor or the like, for example, even in such a case as on-board collection of information for the diagnosis of a fault of the system, leading to the advantage that a contribution can be made to substantial improvements in repair services.

In the above-described embodiment, the idling speed control system was determined to be in order when the engine speed had fallen in the predetermined speed range in the first preset time T1 subsequent to entrance to the feedback control mode and the engine speed had then remained in the above speed range for the second preset time T2. It is however possible, without setting the first preset time T1, to determine that the idling speed control system is in order, when in the course of operation in the feedback control mode, the engine speed fell within the speed range including the target idling speed and has then remained in the above speed range for the second preset time T2.

In the embodiment described above, the idling speed control was performed by controlling the quantity of air through the bypass passage which extends bypassing the throttle valve. The present invention can however be applied equally to such a technique that idling speed control is performed by directly driving a throttle valve and controlling the quantity of air through the intake passage.

Although the above embodiment was described with respect to the system according to this invention as applied to the automotive engine (internal combustion engine), the system of this invention is not limited to such an engine. It can be similarly applied to engines used as various power sources, thereby bringing about advantageous effects similar to those described above.

What is claimed is:

1. A method for the diagnosis of an idling speed control system, said system comparing a target idling speed with an engine speed when an internal combustion engine is operated in a feedback control mode and, based on the result of the comparison, controlling the quantity of air to be fed to said engine so that the engine is feedback-controlled to make the engine speed equal to the target idling speed, which comprises:

determining that said idling speed control system is out of order when the engine speed has departed from a predetermined speed range including the target idling speed after the engine speed fell within the predetermined speed range during operation in the feedback control mode, wherein said predetermined speed range is set so that the difference between the upper limit of the predetermined speed range and the target idling speed becomes greater than the difference between the target idling speed and the lower limit of the predetermined speed range.

2. A method for the diagnosis of an idling speed control system, said system comparing a target idling speed with an engine speed when an internal combustion engine is operated in a feedback control mode and, based on the result of the comparison, controlling the quantity of air to be fed to said engine so that the engine is feedback-controlled to make the engine speed equal to the target idling speed, which comprises:

determining that said idling speed control system is in order when the engine speed remains for a predetermined time in a predetermined speed range including the target idling speed after the engine speed has fallen within the predetermined speed range during operation in the feedback control mode, wherein said predetermined speed range is set so that the difference between the upper limit of the predetermined speed range and the target idling speed becomes greater than the difference between the target idling speed and the lower limit of the predetermined speed range.

3. A method for the diagnosis of an idling speed control system, said system comparing a target idling speed with an engine speed when an internal combustion engine is operated in a feedback control mode and based on the result of the comparison, controlling the quantity of air to be fed to said engine so that the engine is feedback-controlled to make the engine speed equal to the target idling speed, which comprises:

determining that said idling speed control system is in order when after entrance to the feedback control mode, the engine speed fell in a first preset time within a predetermined speed range including the target idling speed and has then remained in the speed range for a second preset time.

4. A method according to claim 3, wherein said idling speed control system is determined to be out of order when the engine speed does not fall within the predetermined speed range even after the first preset time has elapsed since the entrance to the feedback control mode.

5. A method for the diagnosis of an idling speed control system, said system comparing a target idling speed with an engine speed when an internal combustion engine is operated in a feedback control mode and based on the result of the comparison, controlling the quantity of air to be fed to said engine so that the engine is feedback-controlled to make the engine speed equal to the target idling speed, which comprises:

determining that said idling speed control system is in order, when after entrance to the feedback control mode, the engine speed fell in a first preset time within a predetermined speed range including the target idling speed and has then remained in the speed range for a second preset time; but determining that said idling speed control system is out of order when after entrance to the feedback control mode, the engine speed falls in the first preset time within the speed range but has then departed from the speed range.

6. A method according to claim 5, wherein said idling speed control system is determined to be out of order when the engine speed does not fall within the predetermined speed range even after the first preset time has elapsed after entrance to the feedback control mode.

7. A method according to claim 5, wherein said predetermined speed range is set so that the difference between the upper limit of the predetermined speed range and the target idling speed becomes greater than the difference between the target idling speed and the lower limit of the predetermined speed range.

8. A system for the diagnosis of an idling speed control system, said idling speed control system comparing a target idling speed with an engine speed when an internal combustion engine is operated in a feedback control mode and based on the result of the comparison, controlling the quantity of air to be fed to said engine so that the engine is feedback-controlled to make the engine speed equal to the target idling speed, which comprises:

first timer means for measuring the time elapsed since the time point of entrance to the feedback control mode;

engine speed state detection means for detecting whether or not the engine speed has fallen within a predetermined speed range including the target idling speed;

second timer means for measuring the time elapsed since the engine speed has been detected by said engine speed state detection means to fall within the predetermined speed range; and normality determining means for determining that said idling speed control system is in order, when the time measured by said first timer means is within a first preset time, the engine speed has been detected by said engine speed state detection means to have fallen within the predetermined speed range and the engine speed has remained in the predetermined speed range until the time measured by said second timer means reaches a second preset time.

9. A system according to claim 8, further comprising abnormality determining means for determining that said idling speed control system is out of order, when the time measured by said first timer means is within the first preset time and the engine speed is detected by said engine speed state detection means to have fallen within the predetermined speed range but the engine speed has then departed from the predetermined speed range.

10. A system according to claim 9, wherein said abnormality determining means determines that said idling speed control system is out of order, when the engine speed does not fall within the predetermined speed range even after the first preset time has elapsed since entrance to the feedback control mode.

11. A system according to claim 9, wherein said predetermined speed range is set so that the difference between the upper limit of the predetermined speed range and the target idling speed becomes greater than the difference between the target idling speed and the lower limit of the predetermined speed range.

* * * * *